W. H. McLEOD.
MOVABLE HEADLIGHT.
APPLICATION FILED FEB. 21, 1921.
1,420,564.
Patented June 20, 1922.
3 SHEETS—SHEET 1.
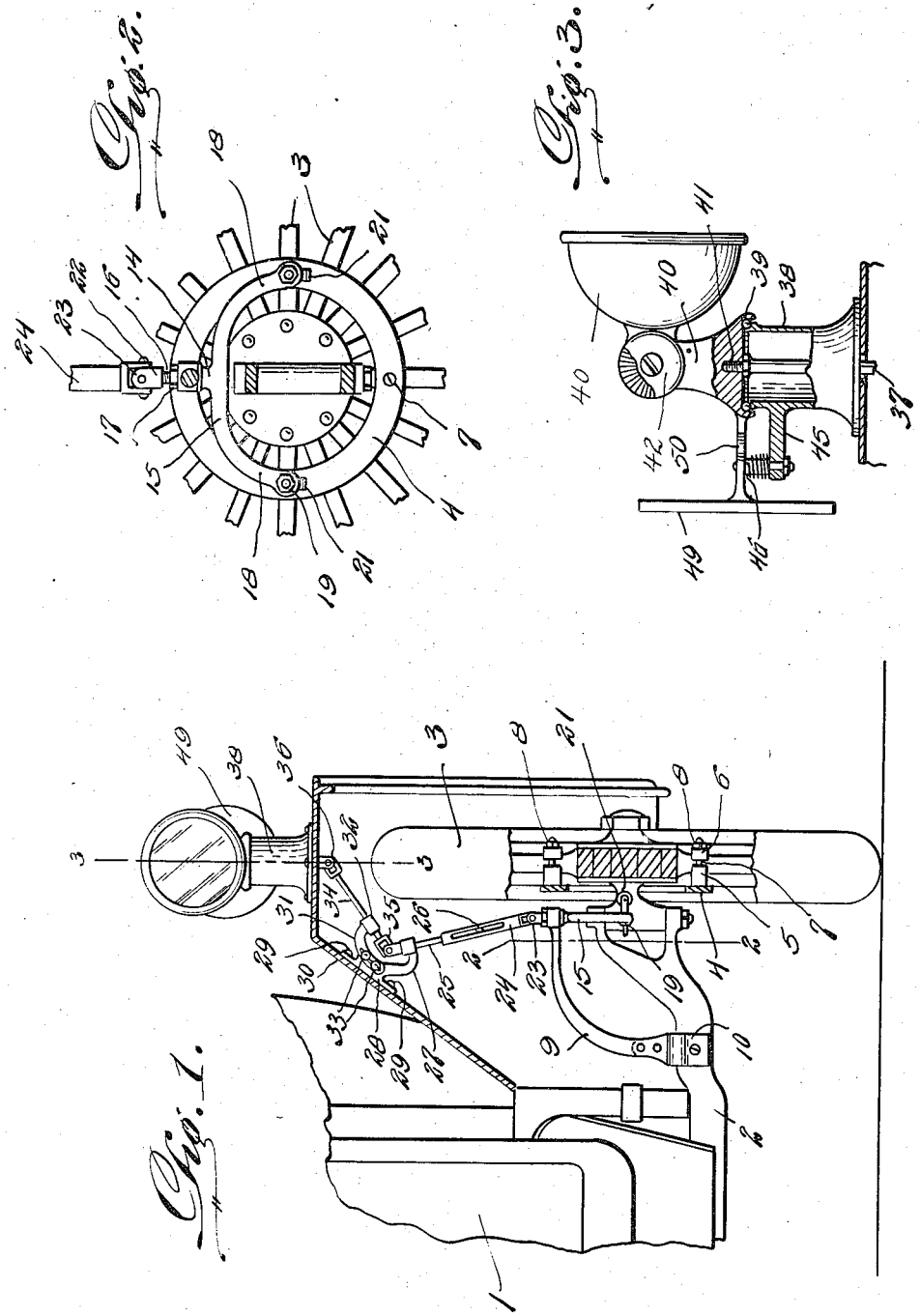

W. H. McLEOD.
MOVABLE HEADLIGHT.
APPLICATION FILED FEB. 21, 1921.
1,420,564.
Patented June 20, 1922.
3 SHEETS—SHEET 2.
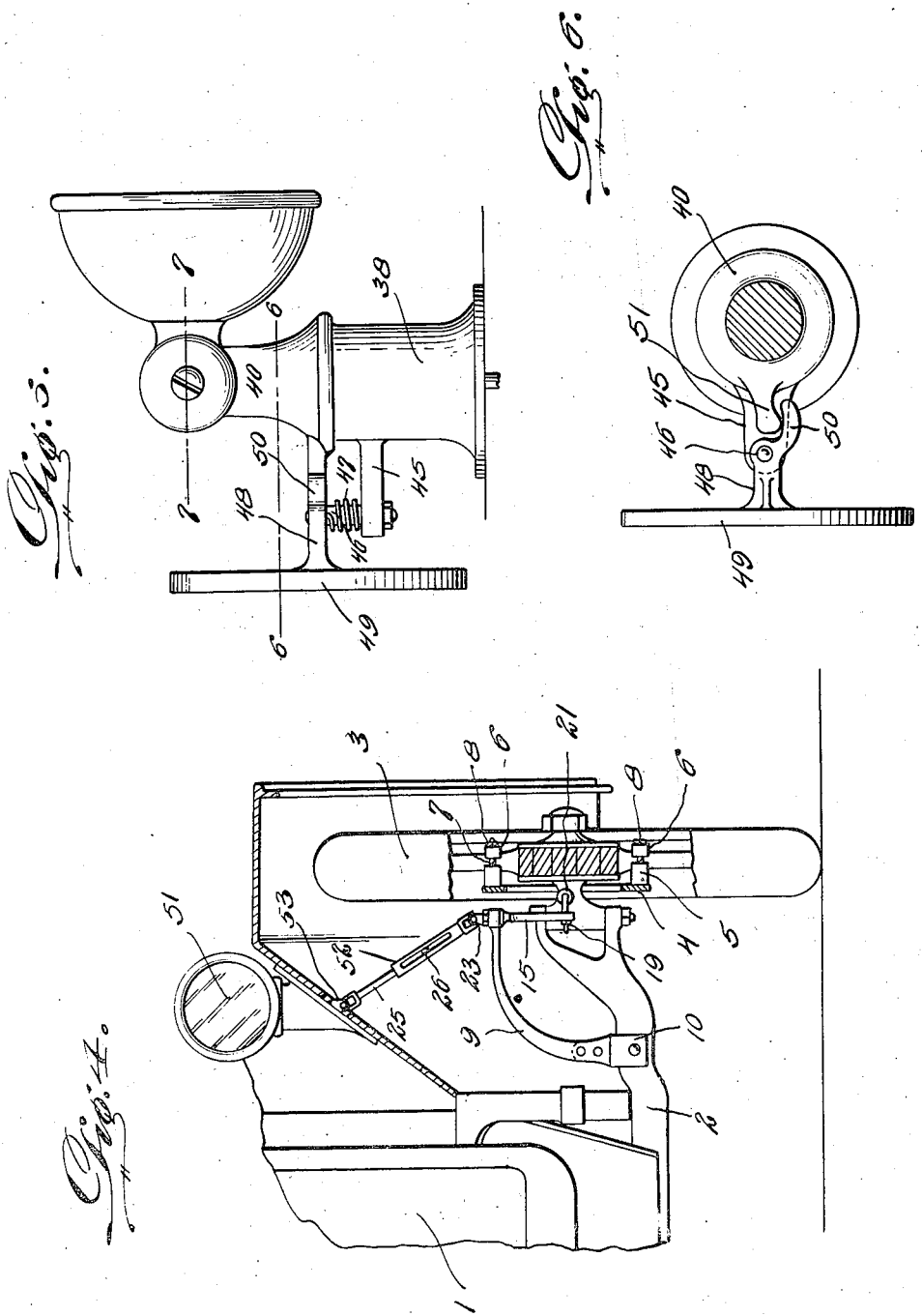

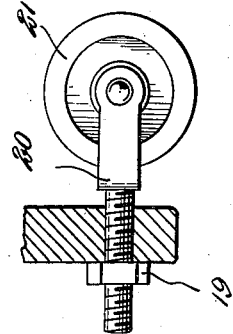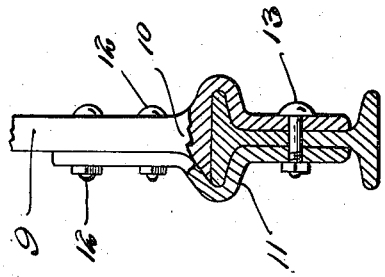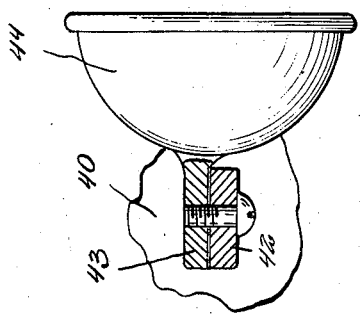

UNITED STATES PATENT OFFICE.

WALTER H. McLEOD, OF ST. PAUL, MINNESOTA.

MOVABLE HEADLIGHT.

1,420,564.   Specification of Letters Patent.   Patented June 20, 1922.

Application filed February 21, 1921. Serial No. 446,722.

*To all whom it may concern:*

Be it known that I, WALTER H. McLEOD, a citizen of the United States, residing at St. Paul, in the county of Ramsey and State of Minnesota, have invented new and useful Improvements in Movable Headlights, of which the following is a specification.

My present invention has reference to a dirigible headlight for vehicles.

My object is to produce a simple mechanism connected with a movable headlight and actuated on the turning of the wheel to cause the rays from the light to at all times be directed over and directly ahead of the vehicle wheels.

A further object is to produce a means for turning a headlight to cause the rays of light therefrom to be directed directly over and in a line with the steering wheels in accordance with the varying angles which they assume, and which shall have associated therewith means for turning a mirror so that the operator of the machine can observe conditions directly behind the machine, regardless of the angles which the machine assumes.

A still further object of the invention is to produce a means for turning a headlight simultaneously with the turning of the steering wheels of an automobile or the like, which shall be of an adjustable nature, whereby the same can be attached to varying makes of automobiles, and which includes telescopic parts to compensate for the vibration of the machine.

The foregoing, and other objects which will appear as the nature of the invention is better understood, may be accomplished by a construction, combination and operative association of parts, such as is disclosed by the drawings which accompany and which form part of this application.

In the drawings:—

Figure 1 is a front elevation of a sufficient portion of an automobile to illustrate the application of the improvement thereon.

Figure 2 is a sectional view on the line 2—2 of Figure 1.

Figure 3 is a sectional view on the line 3—3 of Figure 2.

Figure 4 is a view similar to Figure 1, but illustrating the arrangement of parts when the headlight is positioned on the side instead of the top of the mud guard.

Figure 5 is an enlarged elevation of the headlight and the standard therefor.

Figure 6 is a sectional view on the line 6—6 of Figure 5.

Figure 7 is a sectional view on the line 7—7 of Figure 5.

Figures 8 and 9 illustrate details.

Referring now to the drawings in detail, the numeral 1 designates the front portion of an automobile, 2 the front axle provided with the usual yoke shaped end in which is pivoted the spindle on which the wheel 3 is journaled.

On the inner face of the wheel 3, surrounding the hub thereof I secure a metallic flat ring or disk 4. The disk 4 has on its outer face clamps which embrace and bind against certain of the spokes of the wheel. Each of the clamps is preferably constructed of rubber or like compressible material and of a sufficient strength, and each includes an inner member 5 and an outer member 6. Passing through these members are bolts 7 that are secured to the disk 4, the said bolts being threaded and being engaged by nuts 8 which compress the outer clamp section 6 against the inner clamp section 5.

On the axle 2, I clamp a bracket 9. The bracket is directed toward the wheel 3, having its outer portion straight and its inner portion arched or curved downwardly and formed to engage the top and one side of the I beam construction of the front axle. This portion of the bracket is indicated for distinction by the numeral 10 and is engaged by a clamp member 11 of a similar construction. Through the portion 10 and the clamp 11 binding elements 12 are passed, and on the portion of the clamp that contacts with the web of the axle, and also, if desired, on the portion of the bracket that contacts with the opposite side of the axle, there are binding means 13 that hold the bracket from movement longitudinally on the axle. The straight end of the bracket 9 has a bearing opening therethrough in which is journaled a bearing boss 14 formed on the under face of an arched plate 15. The boss 14 has its upper end provided with a reduced threaded portion 16 that is engaged by a nut 17 so that the arched plate is thus retained on the bracket. The curved arms 18 of the arched plate 15 have their ends terminating in a line and disposed opposite the axial center of the disk 4. On the inner face of each of the arms 18, at the ends thereof there is adjustably secured, by means 19, members 20 that carry at their outer ends anti-frictional elements 21 that are disposed in contacting relation with the disk 4.

The arched plate 15, at the center thereof has an extension 22 which is connected, through the medium of a universal joint 23 with the lower section 24 of a telescopic shaft. The outer section 25 of the shaft is received in the lower section. Both of these sections are round in cross section and the lower section 24 is provided with an elongated slot that receives therethrough a lug 26 carried by the outer section 25. The telescopic shaft is directed upwardly and finds a bearing in the offset end or arm 27 of a bracket 28 that is secured, as at 29, to the under face of the mud guard 30 of the machine. On the upper portion of the bracket there is adjustably sustained a slotted arm 31 that has its outer end provided with a sleeve-like bearing 32. Passing through the slots of the arm 31 and entering threaded openings in the bracket, and having their heads binding against the said arm 31 are threaded elements 33. By this means, the bearing 32 may be adjusted toward or away from the bracket. In the bearing, and extending therethrough there is a shaft section 34 connected by a universal joint 35 to the upper or outer section 25 of the telescopic shaft. The shaft section 34 is in turn connected by a universal joint 36 to a vertically disposed shaft section 37 that passes through an opening in the top of the mud guard and that is also received through the center of a standard 38 that is secured on the top of the mud guard. This shaft section comprises the post for the lamp, as will presently be apparent. The standard comprises a hollow member which is round in plan and which has its outer end formed with a continuous depression for the reception of anti-frictional balls 39. These balls are also received in a similar raceway formed in the lower face of a head member 40 that is disposed over the standard, and to this head member the shaft section 37 is connected by means 41. It will be apparent that when the wheel is turned, the disk 4 contacting with the antifrictional members 21 on the arms of the arched plate 15, will cause the plate to turn in the same direction as the wheel, and through the medium of the telescopic and other shaft sections, the head 40 will likewise turn in the same direction as the wheel.

On the head member 40 at the upper and reduced portion thereof there is a radially notched or serrated integral disk-like member 42. This disk has its serrations engaged by similar serrations on a disk-like member 43 formed at one end of a head light casing 44. By this arrangement, the headlight may be adjusted at varying angles in a vertical direction with respect to the machine.

On the standard 38 there is an outstanding lug 45. On this lug there is an upstanding shaft 46 which is influenced to one position by a spring 47. Connected to the shaft by an arm 48 is a mirror 49. The arm has an extension 50 which is in the path of contact with a lug 51 outstanding from the head 40. It will be apparent that when the head is turned, as previously described, the lug 51 will strike the extension 50, of the arm 48 and will swing the mirror against the influence of the spring 47. After such contact the mirror will be returned to initial position by the influence of the spring.

In Figure 4 of the drawings, I have illustrated a headlight 51 arranged on the side instead of on the top of the mud guard. The connecting means between the arched plate 15 and the headlight are similar to those above described, except, of course, only the telescopic shaft 52 and the straight shaft extension 53, connected to the telescopic shaft by a universal joint, are employed. The last mentioned shaft is secured by the same means heretofore stated, to the head member of the standard, and it is thought that the foregoing description, when taken in connection with the drawings will fully set forth the simplicity, construction and advantages of the improvement.

Having described the invention, I claim:—

1. In a dirigible headlight for automobiles, a disk secured around the hub of the steering wheel of the automobile, pivotally supported anti-frictional means contacting the disk at the opposite sides of the horizontal center of the wheel, a turnable headlight, and universally connected telescopic means connecting said headlight to said first mentioned means.

2. In a dirigible headlight for automobiles, a flat disk surrounding the hub of a steering wheel of the automobile, compressible clamps securing said disk to the spokes of the wheel, means contacting the disk at opposite sides of the horizontal center of the wheel, a turnable headlight, and universally connected telescopic means connecting said headlight to said first mentioned means.

3. In a dirigible headlight for automobiles, a disk surrounding the hub and clamped on the steering wheel of the automobile, a pivotally supported U-shaped member, antifrictional means on the ends thereof contacting the sides of the disk at points in a line with the horizontal axial center of the wheel, a turnable headlight, and universally connected telescopic means connecting said headlight to said U-shaped member.

4. In a dirigible headlight for automobiles, a disk surrounding the hub and clamped on the steering wheel of an automobile, a bracket on the axle for the steering wheel directed toward and terminating above the disk, pivotally supported means on the bracket in contacting engagement with the disk at points in a line with the horizontal center thereof, a turnable headlight, means comprising telescopic and universally connected members between the headlight and first mentioned means for causing the headlight to turn when said first mentioned means is influenced by the angular relation of the wheel to its axle.

5. In a dirigible headlight for automobiles, a ring-like disk surrounding the hub of the wheel and secured to said wheel, an arched bracket clamped on the front axle of the machine and directed toward the steering wheel, a U-shaped member pivotally supported on the bracket, adjustable members on the ends thereof, anti-frictional elements carried thereby in contacting engagement with the disk in a line with the horizontal axial center of the wheel, a bracket on the under face of the mud guard of the automobile, a turnable headlight on the mud guard, a telescopic shaft having a flexible connection with the U-shaped member and finding a bearing in the last mentioned bracket, a second shaft also finding a bearing in said second mentioned bracket universally connected to the first mentioned shaft and to the post for the lamp.

In testimony whereof I affix my signature.

WALTER H. McLEOD.